United States Patent
Lobo et al.

(10) Patent No.: US 10,144,365 B2
(45) Date of Patent: Dec. 4, 2018

(54) VEHICLE BADGE

(71) Applicant: Ford Global Technologies, LLC, Dearborn, MI (US)

(72) Inventors: Harry Lobo, Canton, MI (US); Paul Kenneth Dellock, Northville, MI (US); Stuart C. Salter, White Lake, MI (US); Brian Siler, Richmond, MI (US); James T. Colliflower, Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 221 days.

(21) Appl. No.: 15/402,572

(22) Filed: Jan. 10, 2017

(65) Prior Publication Data

US 2018/0194277 A1 Jul. 12, 2018

(51) Int. Cl.
*B60R 13/00* (2006.01)

(52) U.S. Cl.
CPC ....... *B60R 13/005* (2013.01); *B60Y 2410/123* (2013.01)

(58) Field of Classification Search
CPC .................. B60R 13/005; B60Y 2410/123
See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |
| 5,434,013 A | 7/1995 | Fernandez |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,264,869 B1 | 7/2001 | Notarpietro et al. |
| 6,276,179 B1 | 8/2001 | Janssen et al. |
| 6,294,990 B1 | 9/2001 | Knoll et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |

(Continued)

FOREIGN PATENT DOCUMENTS

| CN | 101337492 A | 1/2009 |
|---|---|---|
| CN | 201169230 Y | 2/2009 |

(Continued)

*Primary Examiner* — Adam Krupicka
(74) *Attorney, Agent, or Firm* — Jason Rogers; Price Heneveld LLP (57) ABSTRACT

A badge is provided herein. The badge includes a substrate coupled to a bezel. One or more apertures are defined by the substrate and extend from a front portion to a rear portion of the substrate. One or more troughs are defined by the substrate and are disposed on a rear portion of the substrate. An overmold material is disposed on the front portion of the substrate, through the one or more apertures, and within the one or more troughs.

20 Claims, 9 Drawing Sheets

(56) References Cited

U.S. PATENT DOCUMENTS

| | | |
|---|---|---|
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,372,493 B2 | 2/2013 | Greve |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,858,854 B2 | 10/2014 | Oin |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,452,709 B2 | 9/2016 | Aburto Crespo |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0265360 A1 | 11/2011 | Podd et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0119038 A1 | 5/2014 | Mulder et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0307033 A1 | 10/2015 | Preisler et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2016/0237583 A1 | 8/2016 | Case et al. |
| 2016/0240794 A1 | 8/2016 | Yamada et al. |
| 2017/0158125 A1 | 6/2017 | Schuett et al. |
| 2017/0253179 A1 | 9/2017 | Kumada |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| DE | 202010005541 U1 | 9/2010 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

VEHICLE BADGE

FIELD OF THE INVENTION

The present disclosure generally relates to vehicle badges, and more particularly, to a badge incorporating a plurality of components.

BACKGROUND OF THE INVENTION

Badges are commonly employed on vehicles to prominently display a vehicle manufacturer's logo, name, or other graphic display. For some vehicles, it may be desirable to have a more prominent upscale badge to enhance the attractiveness of the vehicle and the graphic display.

SUMMARY OF THE INVENTION

According to one aspect of the present invention, a badge is disclosed herein. The badge includes a substrate coupled to a bezel. One or more apertures are defined by the substrate and extend from a front portion to a rear portion of the substrate. One or more troughs are defined by the substrate and are disposed on a rear portion of the substrate. An overmold material is disposed on the front portion of the substrate, through the one or more apertures, and within the one or more troughs.

According to another aspect of the present invention, an emblem is disclosed. The emblem includes a substrate. A first aperture is defined by the substrate and has a first width. A trough is defined by the substrate and is disposed on a rear portion of the substrate. The trough has a second width that is wider than the first width. An overmold material is disposed on a front portion of the substrate, through the first aperture, and within the trough.

According to yet another aspect of the present invention, a badge is disclosed herein. The badge includes a substrate having a front portion and a rear portion. Indicia is disposed on the front portion. An aperture is defined by the substrate. An overmold material is disposed on the front portion, through the aperture, and along the rear portion.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
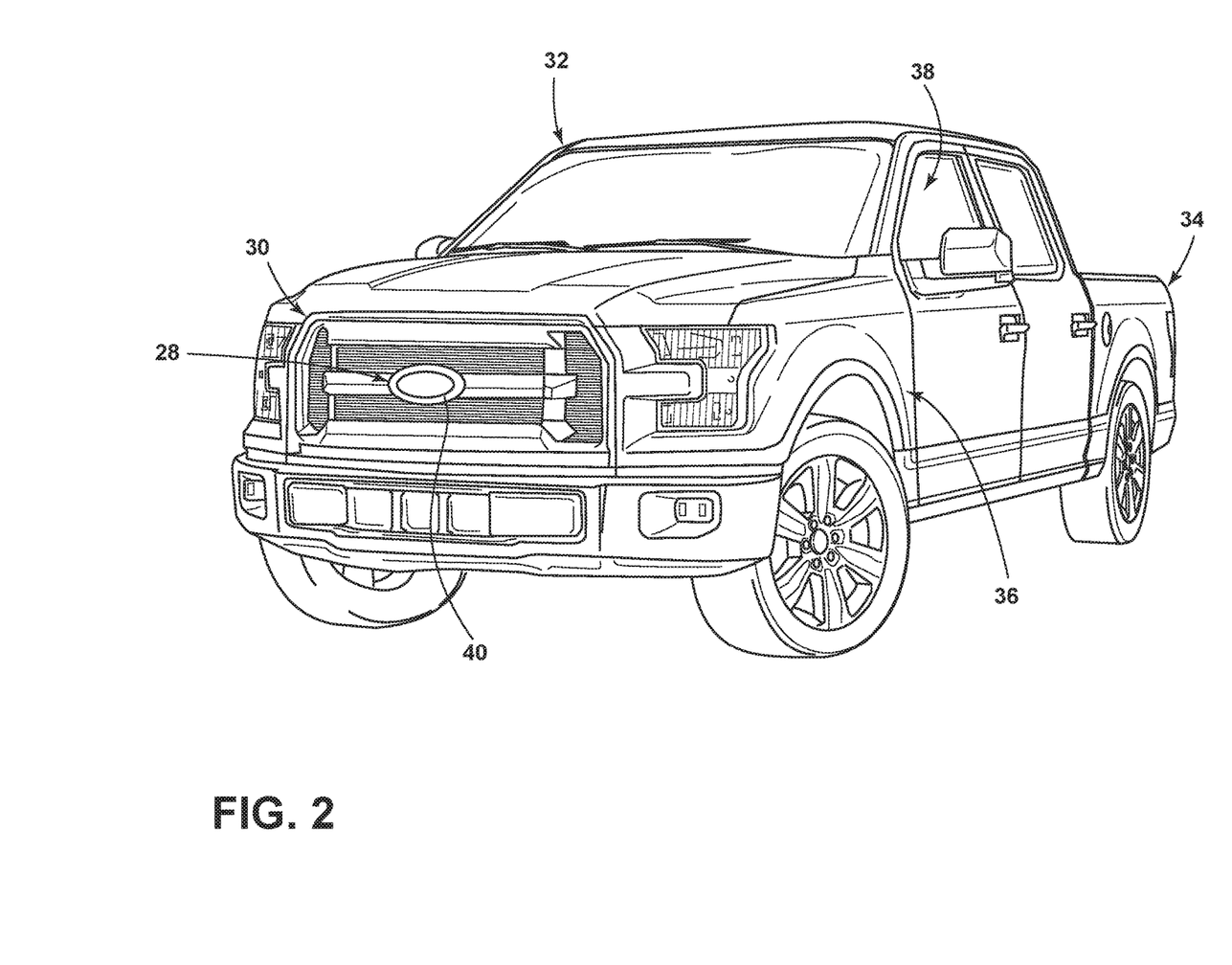
FIG. 2 is a front perspective view of a badge mounted to a front portion of a vehicle.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a badge. The badge may advantageously employ an overmold material that is mechanically coupled to a substrate through one or more apertures. The badge may also advantageously employ one or more phosphorescent and/or luminescent structures that may be configured to accept ambient light and/or light received from an associated light source and re-emit the light at a different wavelength typically found in the visible spectrum.

Figure 1A:
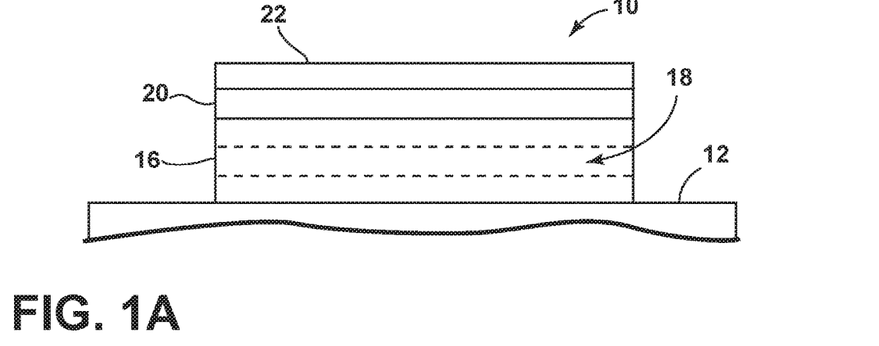
FIG. 1A is a side view of a luminescent structure rendered as a coating for use in a luminescent latch assembly according to one embodiment.
Figure 1B:
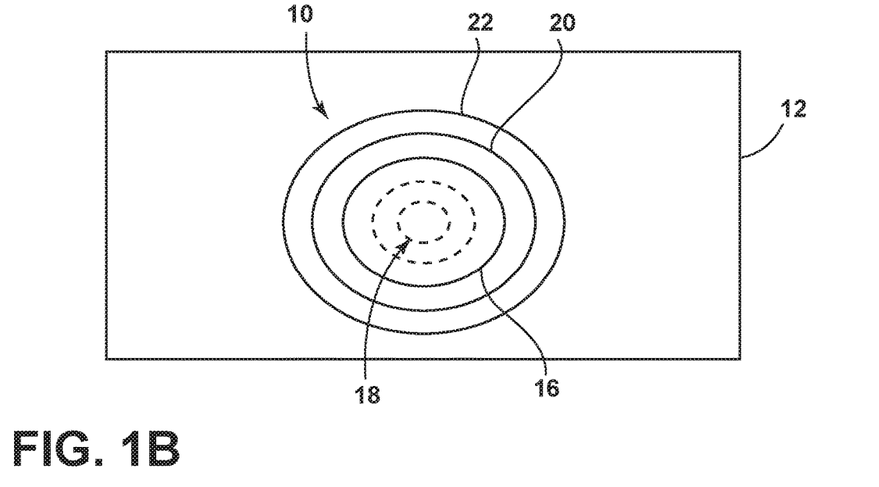
FIG. 1B is a top view of a luminescent structure rendered as a discrete particle according to one embodiment.
Figure 1C:
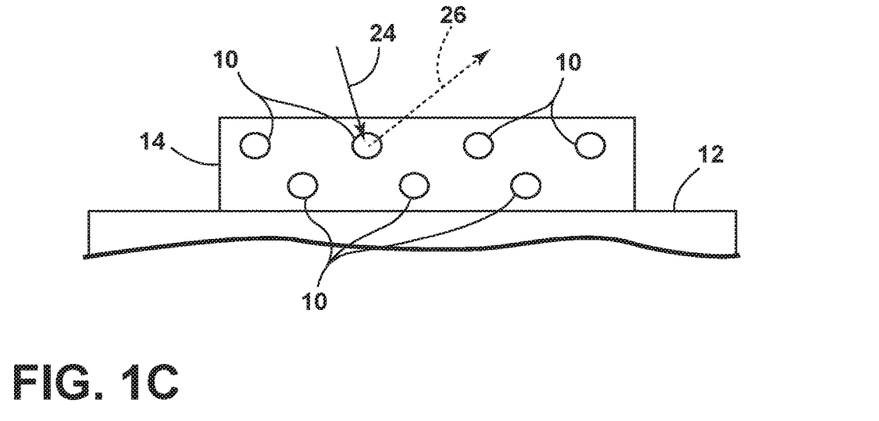
FIG. 1C is a side view of a plurality of luminescent structures rendered as discrete particles and incorporated into a separate structure.

Referring to FIGS. 1A-1C, various exemplary embodiments of luminescent structures 10 are shown, each capable of being coupled to a substrate 12, which may correspond to a vehicle fixture or vehicle related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown through broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the luminescent structure 10. Conversely, under the principle of up conversion, the excitation light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

Light emitted by a light source (such as an ambient light source and/or the sun) may be referred to herein as excitation light 24 and is illustrated herein as solid arrows. In contrast, light emitted from the luminescent structure 10 may be referred to herein as converted light 26 and may be illustrated herein as broken arrows.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of luminescent structures 10 is disclosed in U.S. Pat. No. 8,232,533 to Kingsley et al., the entire disclosure of which is incorporated herein by reference. For additional information regarding fabrication and utilization of luminescent materials to achieve various light emissions, refer to U.S. Pat. No. 8,207,511 to Bortz et al., U.S. Pat. No. 8,247,761 to Agrawal et al., U.S. Pat. No. 8,519,359 to Kingsley et al., U.S. Pat. No. 8,664,624 to Kingsley et al., U.S. Patent Publication No. 2012/0183677 to Agrawal et al., U.S. Pat. No. 9,057,021 to Kingsley et al., and U.S. Pat. No. 8,846,184 to Agrawal et al., all of which are incorporated herein by reference in its entirety.

According to one embodiment, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the luminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in some embodiments, the rare earth aluminum garnet type Ce phosphor may serve as the luminescent material 18 with ultra-short-persistence characteristics, which can emit the converted light 26 by absorbing purple to blue excitation light 24 emitted from the light sources. According to one embodiment, a ZnS:Ag phosphor may be used to create a blue converted light 26. A ZnS:Cu phosphor may be utilized to create a yellowish-green converted light 26. A $Y_2O_2S:Eu$ phosphor may be used to create red converted light 26. Moreover, the aforementioned phosphorescent materials may be combined to form a wide range of colors, including white light. It will be understood that any short-persistence luminescent material known in the art may be utilized without departing from the teachings provided herein. Additional information regarding the production of short-persistence luminescent materials is disclosed in U.S. Pat. No. 8,163,201 to Kingsley et al., the entire disclosure of which is incorporated herein by reference.

Additionally, or alternatively, the luminescent material 18, according to one embodiment, disposed within the luminescent structure 10 may include a long-persistence luminescent material 18 that emits the converted light 26, once charged by the excitation light 24. The excitation light 24 may be emitted from any excitation source (e.g., any natural light source, such as the sun, and/or any artificial light sources). The long-persistence luminescent material 18 may be defined as having a long decay time due to its ability to store the excitation light 24 and release the converted light 26 gradually, for a period of several minutes or hours, once the excitation light 24 is no longer present.

The long-persistence luminescent material 18, according to one embodiment, may be operable to emit light at or above an intensity of 0.32 $mcd/m^2$ after a period of 10 minutes. Additionally, the long-persistence luminescent material 18 may be operable to emit light above or at an intensity of 0.32 $mcd/m^2$ after a period of 30 minutes and, in some embodiments, for a period substantially longer than 60 minutes (e.g., the period may extend 24 hours or longer, and in some instances, the period may extend 48 hours). Accordingly, the long-persistence luminescent material 18 may continually illuminate in response to excitation from any light sources that emit the excitation light 24, including, but not limited to, natural light sources (e.g., the sun) and/or any artificial light sources. The periodic absorption of the excitation light 24 from any excitation source may provide for a substantially sustained charge of the long-persistence luminescent material 18 to provide for consistent passive illumination. In some embodiments, a light sensor may monitor the illumination intensity of the luminescent structure 10 and actuate an excitation source when the illumination intensity falls below 0.32 $mcd/m^2$, or any other predefined intensity level.

The long-persistence luminescent material 18 may correspond to alkaline earth aluminates and silicates, for example doped di-silicates, or any other compound that is capable of emitting light for a period of time once the excitation light 24 is no longer present. The long-persistence luminescent material 18 may be doped with one or more ions, which may correspond to rare earth elements, for example, $Eu^{2+}$, $Tb^{3+}$ and/or $Dy^3$. According to one non-limiting exemplary embodiment, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to one embodiment, may be a translucent white color, and in some instances reflective, when unilluminated. Once the luminescent structure 10 receives the excitation light 24 of a particular wavelength, the luminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Additional information regarding the production of long-persistence luminescent materials is disclosed in U.S. Pat. No. 8,163,201 to Agrawal et al., the entire disclosure of which is incorporated herein by reference. For additional information regarding long-persistence phosphorescent structures, refer to U.S. Pat. No. 6,953,536 to Yen et al., U.S. Pat. No. 6,117,362 to Yen et al., and U.S. Pat. No. 8,952,341 to Kingsley et al., all of which are incorporated herein by reference in their entirety.

Referring to FIG. 2, a badge 28, or emblem, is generally shown mounted on a front portion 30 of a vehicle 32. In other embodiments, the badge 28 may be located elsewhere, such as, but not limited to, a rear portion 34 or either side portion 36 of the vehicle 32. Alternatively, the badge 28 may be disposed within a vehicle compartment 38. The vehicle 32 may include a car, a truck, a van, and/or any other vehicle. The badge 28 may be configured as an insignia that may be presented as an identifying mark of a vehicle manufacturer.

The badge 28 may have a generally oval shape, according to one embodiment, with an outer housing or bezel 40, generally defining the overall oval shape. It should be appreciated that the bezel 40 may be configured in other shapes and sizes to define the outer perimeter housing of the badge 28.

Figure 3:
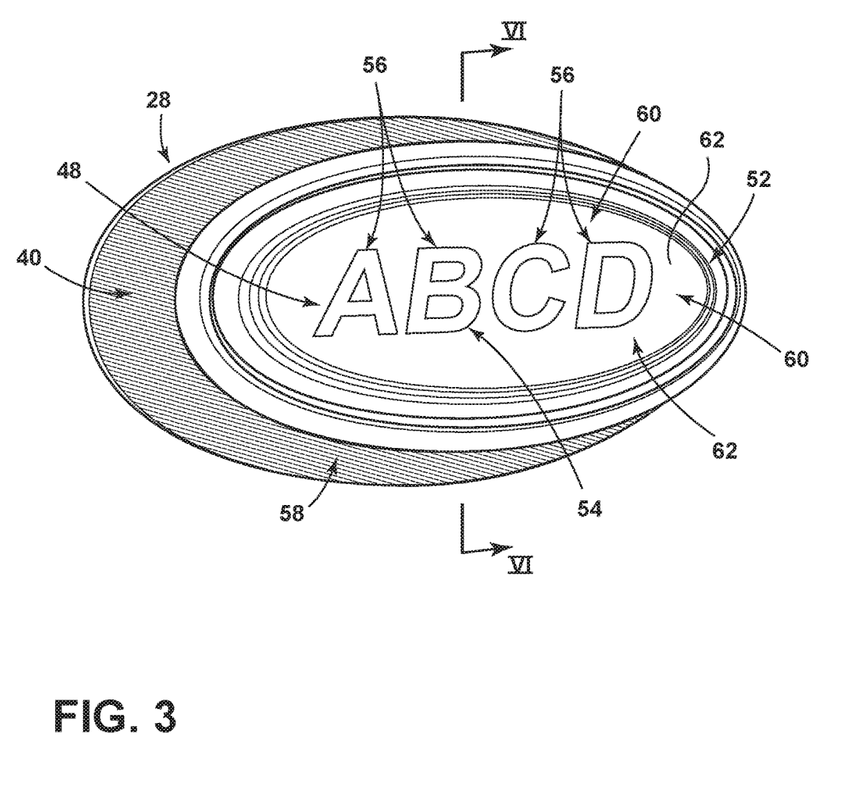
FIG. 3 is a front perspective view of the badge, according to one embodiment.
Figure 4:
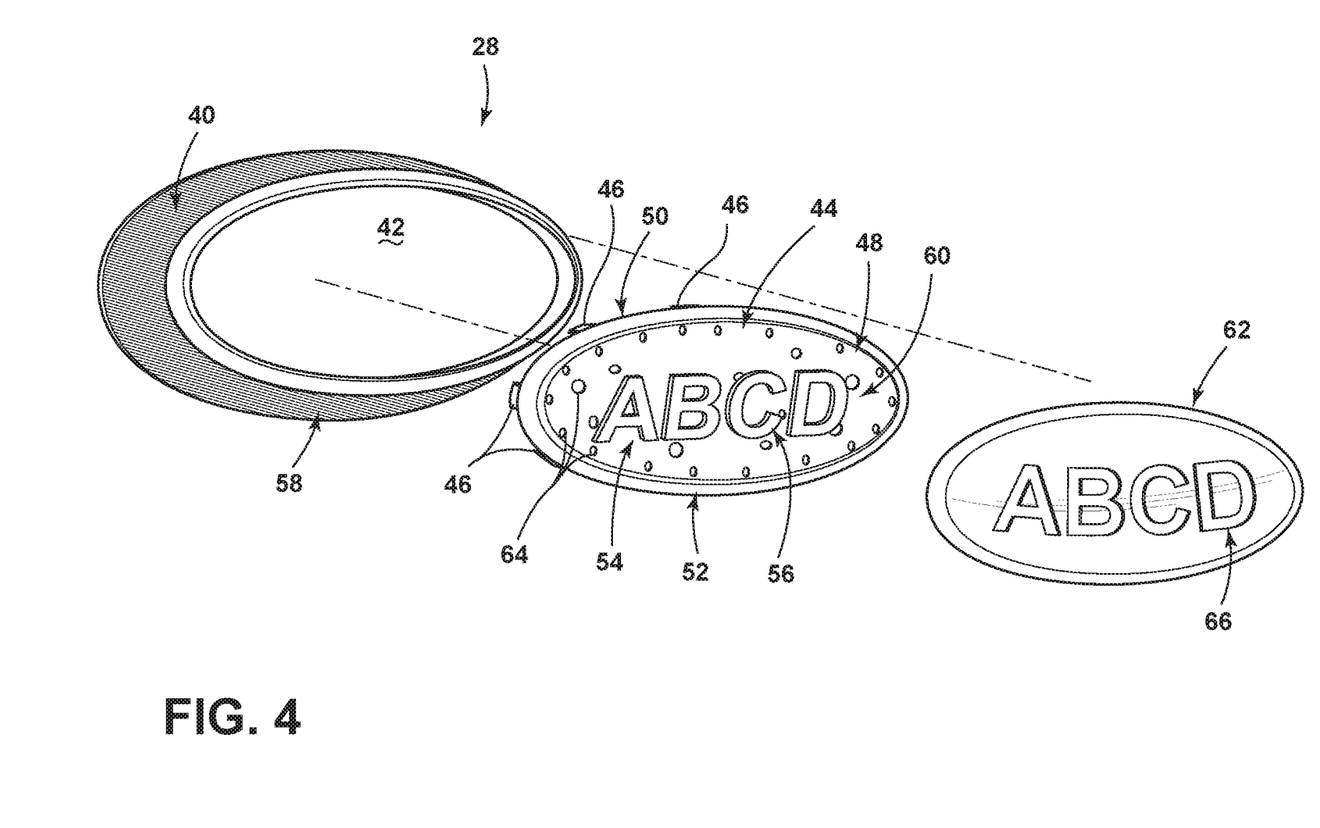
FIG. 4 is a front exploded view of the badge, according to one embodiment.

Referring to FIGS. 3 and 4, the bezel 40 may define a central recess 42. The recess 42 provides an open region into which a substrate 44 may be assembled. The substrate 44 may include a retaining feature 46 to removably, or permanently, couple the substrate 44 to the bezel 40. In alternate embodiments, the substrate 44 may be attached to the bezel 40 through any other method known in the art. Alternatively, the substrate 44 and the bezel 40 may be integrally formed as a single component through one or more compounding manufacturing processes.

The substrate 44 may include a front portion 48 and an opposing rear portion 50. A rim portion 52 may circumferentially surround the front portion 48. A central portion 54 of the substrate 44 may be defined within the rim portion 52. The rim portion 52 extends forwardly of the central portion 54 in various embodiments.

In various embodiments, indicia 56, which may include one or more symbols, letters, numbers, etc., may be disposed within the central portion 54. The indicia 56 may be integrally formed with the substrate 44. Alternatively, in various embodiments, the indicia 56 may be a separate component that is disposed on and/or coupled to the substrate 44. The indicia 56 may signify the make, model, or any other information that may be desirable to confer about the vehicle 32 to onlookers or occupants thereof. As will be described in greater detail below, the bezel 40, the rim portion 52, the indicia 56, and/or any other desired portion of the badge 28 may have a decorative layer 58 thereon.

A background portion 60 is disposed between the indicia 56 and the rim portion 52. An overmold material 62 may be disposed over the background portion 60 and/or the indicia 56. Additionally, and/or alternatively, the overmold material 62 may be disposed within the rim portion 52. In some embodiments, the badge 28 may not include the rim portion 52. Moreover, in various embodiments, the overmold material 62 may extend to one or more edges of the substrate 44 and/or be disposed around the edge.

One or more apertures 64 are defined by the substrate 44. As the overmold material 62 is disposed on the front portion 48 of the substrate 44, a portion of the overmold material 62 flows from the front portion 48 and through the one or more apertures 64 to mechanically couple the overmold material 62 to the substrate 44. In various embodiments, the overmold material 62 may flow along the rear portion 50 of the substrate 44 to further couple the overmold material 62 to the substrate 44. Once the overmold material 62 is disposed on the front portion 48, through the one or more apertures 64, and/or along the rear portion 50 of the badge 28, the overmold material 62 cures thereby holding the overmold material 62 onto the substrate 44. Once the overmold material 62 is disposed through the one or more apertures 64, the one or more apertures 64 may be substantially concealed from a front side of the badge 28.

The overmold material 62 may protect the substrate 44 from physical and chemical damage arising from environmental exposure. The overmold material 62 may have viscoelasticity (i.e., having both viscosity and elasticity), a low Young's modulus, and/or a high failure strain compared with the substrate 44. The overmold material 62 may continue to have flexible properties at low temperatures, such as temperatures below 0 degrees Celsius. According to various embodiments, the overmold material 62 may be formed from a material containing silicone, urethane, flexible polycarbonate, flexible polypropylene, thermoplastic compositions, thermoset compositions, elastomeric compositions, and/or any other flexible and/or moldable material or mixture.

The overmold material 62 may include one or more additives. For example, the overmold material 62 may include one or more materials configured to inhibit the transmission of ultraviolet (UV) light therethrough. Some examples of UV inhibitors that may be integrated into the overmold material 62 may include the following: hindered amines (HALS) or other UV absorbers including oxanilides for polyamides, benzophenones for PVC, and benzotriazoles and hydroxyphenyltriazines for polycarbonate. The UV inhibitors may be configured to block UV light from environmental light sources impinging upon the overmold material 62 from activating the luminescent structure 10.

As illustrated in FIG. 4, the overmold material 62 may be disposed between the rim portion 52 and the indicia 56. Accordingly, the overmold material 62 may define voids 66 into which the indicia 56 protrude. Alternatively, the overmold material 62 may be disposed over the rim portion 52 and/or the indicia 56.

Figure 5:
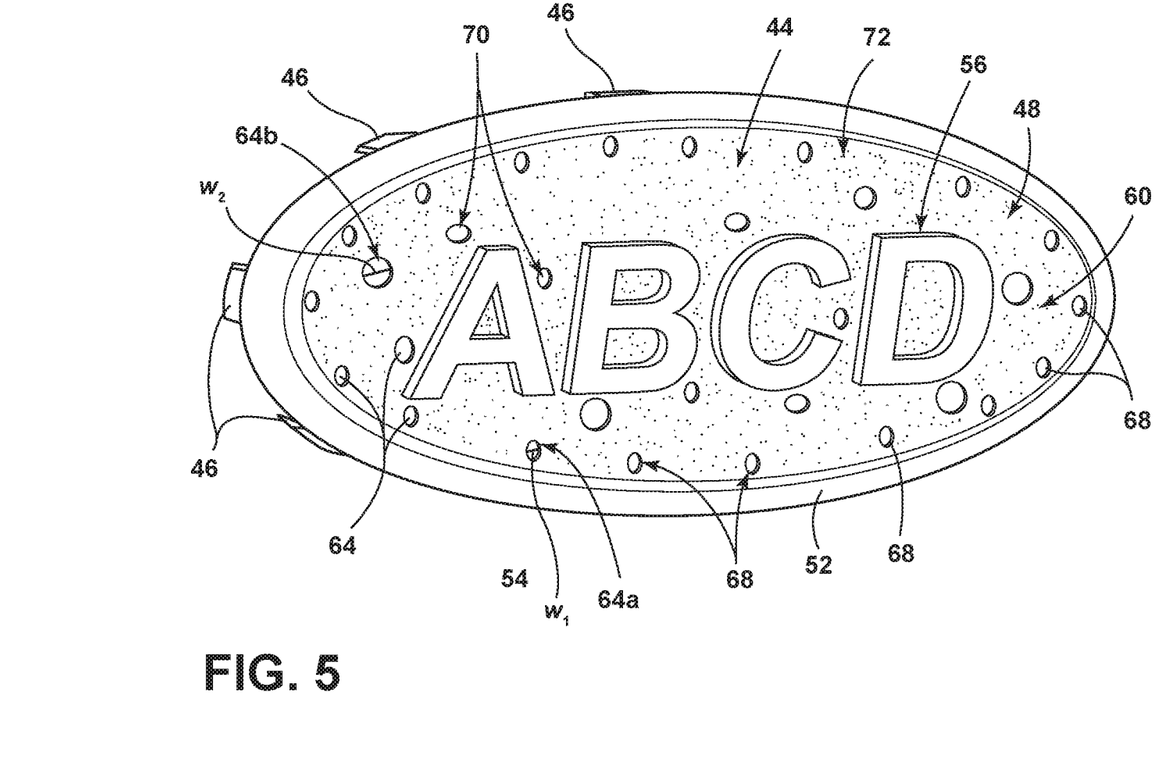
FIG. 5 is a front perspective view of a substrate that is disposed within the badge having a plurality of apertures therethrough.

Referring to FIG. 5, the one or more apertures 64 may be configured of various sizes, geometrical shapes, and/or cross-sectional areas. For example, a first aperture 64a may be substantially circular in cross-sectional shape and may have a first width $w_1$. A second aperture 64b may also be substantially circular in cross-sectional shape and may have a second width $w_2$. The second width $w_2$ may be greater than the first width $w_1$. Moreover, additional apertures 64 may have additional cross-sectional varied geometries and/or varied widths.

As illustrated in FIG. 5, a circumferential portion 68 of apertures 64 may be disposed in close proximity to the rim portion 52 and have a generally similar cross-sectional shape. An inner portion 70 of apertures 64 may be disposed within the circumferential portion 68. The inner portion 70 of apertures 64 may be sized based on the proximity of each aperture 64 within the inner portion 70 to additional apertures 64 within the inner portion 70. Alternatively, the inner portion 70 of apertures 64 may be randomly sized and disposed.

Once the overmold material 62 (FIG. 4) is disposed over a portion of the substrate 44, the overmold material 62 flows through the one or more apertures 64. The deposition of the overmold material 62 within the apertures 64 may increase the coupling of the overmold to the substrate 44. Additionally, the coupling of the overmold material 62 to the substrate 44 can be supplemented with other types of connections, including a chemical bond and/or adhesive bond between the substrate 44 and the overmold material 62 and/or other manners of connections known in the art.

To further increase the coupling and/or adhesion between the substrate 44 and the overmold material 62, a textured, patterned, and/or non-smooth, surface 72, such as a generally knurled, stippled, pyramidal, grained, etc. is formed on portions of the substrate 44 that make contact with the overmold material 62. The textured surface 72 may be simultaneously formed with the substrate 44, machined or thermally imprinted on the substrate 44 after the substrate 44 is formed, and/or formed by other means.

Figure 6:
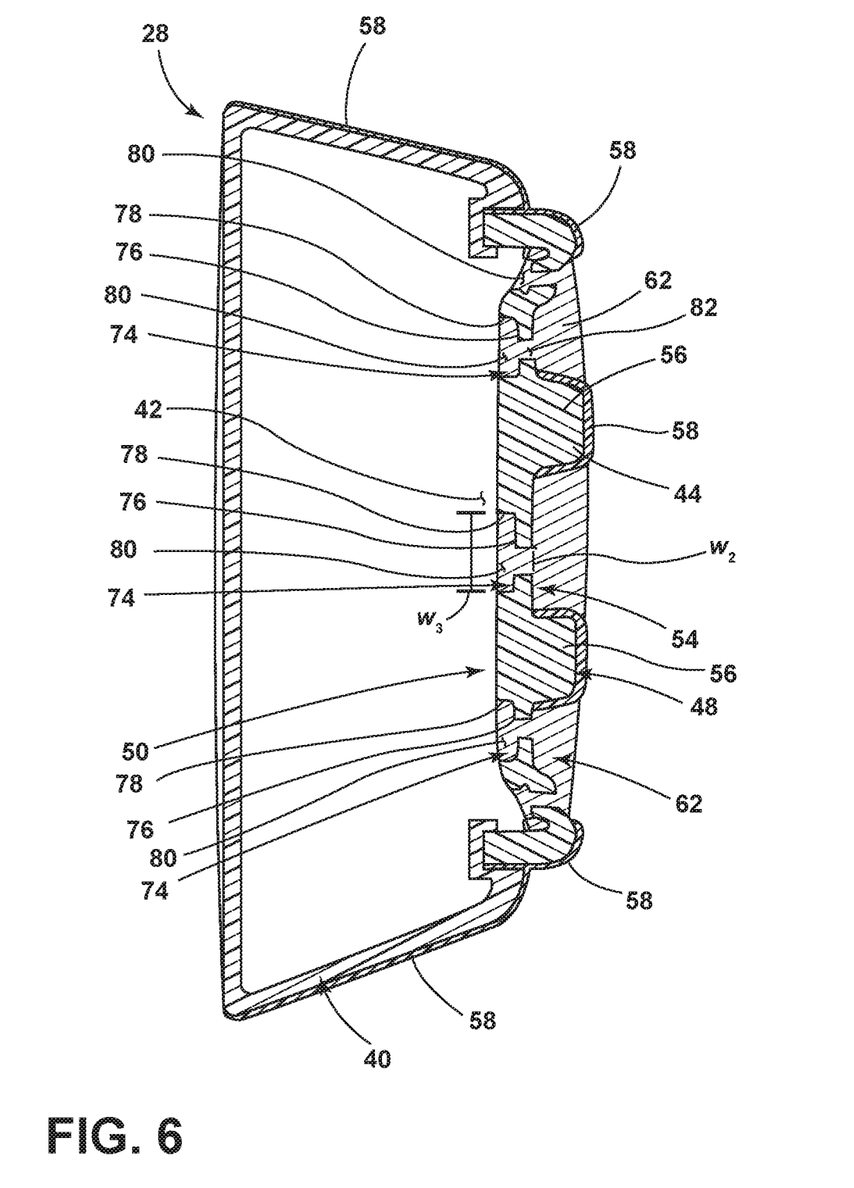
FIG. 6 is a cross-sectional view of the badge taken along line VI-VI of FIG. 3 illustrating the badge according to one embodiment.

Referring to FIG. 6, the substrate 44 may define one or more troughs 74 on the rear portion 50 thereof. The one or more troughs 74 include a bottom wall 76 and a plurality of side walls 78 to define a cavity 80 that is open to two opposing sides. The one or more troughs 74 may be operably coupled with and/or encompass a rear opening 82 of each aperture 64 on the first side and extend rearwardly of each aperture 64. Moreover, the one or more troughs 74 may have a cross-sectional width $w_3$ that is greater than a width of the aperture 64 (e.g., $w_1$, $w_2$). Accordingly, once the overmold material 62 is disposed on the substrate 44, through the apertures 64, and into the one or more troughs 74, the overmold material 62 may extend outwardly of the aperture 64 along the front and the rear portions 48, 50 of the badge 28.

In some embodiments, the decorative layer 58 may be disposed outwardly of the indicia 56 and/or the rim portion 52. However, the decorative layer 58 may be disposed on any other portion of the badge 28 in various embodiments. Moreover, the decorative layer 58 may be disposed on the indicia 56 and/or the rim portion 52 prior to placement of the overmold material 62 onto the substrate 44. Accordingly, the decorative layer 58 may be disposed on an outwardly extending surface of the indicia 56 and between the indicia 56 (or the rim portion 52) and the overmold material 62.

The decorative layer 58 may include a material that is configured to control or modify an appearance of the bezel 40, the substrate 44, and/or any other portion of the badge 28. For example, the decorative layer 58 may be configured to confer a metallic appearance to portions of the badge 28, such as the bezel 40 and/or the rim portion 52 of the substrate 44. The metallic appearance can be disposed on the badge 28 through any method known in the art, including, but not limited to, sputter deposition, vacuum deposition (vacuum evaporation coating), electroplating, or directly printing onto a component of the badge 28. The metallic appearance may be chosen from a wide range of reflective materials and/or colors, including, but not limited to, silver, chrome, copper, bronze, gold, or any other metallic surface. Additionally, an imitator of any metallic material may also be utilized without departing from the teachings provided herein. In various embodiments, the decorative layer 58 may be tinted any color to complement the vehicle structure on which the badge 28 is to be received.

In various embodiments, the decorative layer 58 may have a textured or grained surface. The grained surface may be produced by laser etching the badge 28 and may provide for the badge 28 to have a varied or common appearance with proximately disposed components of the vehicle 32.

Figure 7:
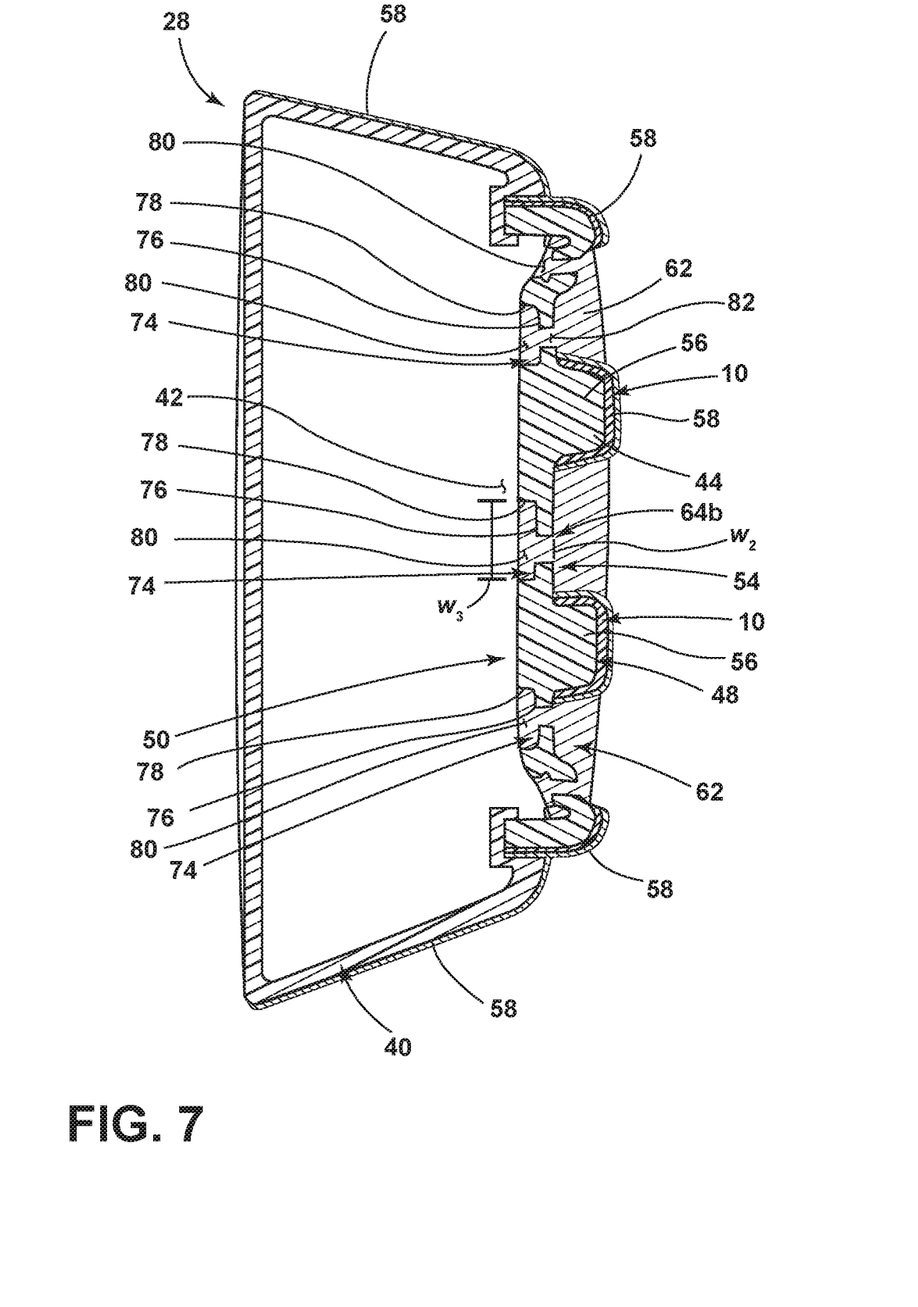
FIG. 7. is a perspective cross-sectional view of the badge taken along line VI-VI of FIG. 3 illustrating the badge according to an alternate embodiment having a luminescent structure disposed on a portion of the badge.

Referring to FIG. 7, the luminescent structure 10 may be disposed on one or more portions (e.g., the rim portion 52, the indicia 56, etc.) of the substrate 44 and/or the bezel 40. Additionally, and/or alternatively, the luminescent structure 10 may be disposed within portions of the overmold material 62. Accordingly, the luminescent structure 10 luminesces to passively illuminate portions of the badge 28. According to various embodiments, the luminescent structure 10 discussed herein is substantially Lambertian, that is, the apparent brightness of the luminescent structure 10 is substantially constant regardless of an observer's angle of view. Accordingly, in some embodiments, the overmold material 62 may be disposed on the substrate 44 at temperatures that do not significantly affect the ability of the luminescent structure 10 to luminesce once the overmold material 62 is disposed on the badge 28.

As described herein, the luminescent structure 10 may include a long-persistence luminescent material 18 such that environmental light (i.e., the sun) may excite the luminescent structure 10 during the day thereby causing the luminescent structure 10 to luminesce in low light conditions. As described herein, the color of the converted light 26 may be significantly dependent on the particular luminescent materials 18 utilized in the luminescent structure 10. Additionally, a conversion capacity of the luminescent structure 10 may be significantly dependent on a concentration of the luminescent material 18 utilized in the luminescent structure 10. By adjusting the range of intensities that may excite the luminescent structure 10, the concentration, types, and proportions of the luminescent materials 18 in the luminescent structure 10 discussed herein may be operable to generate a range of color hues of the excitation light by blending the first wavelength with the second wavelength.

Figure 8:
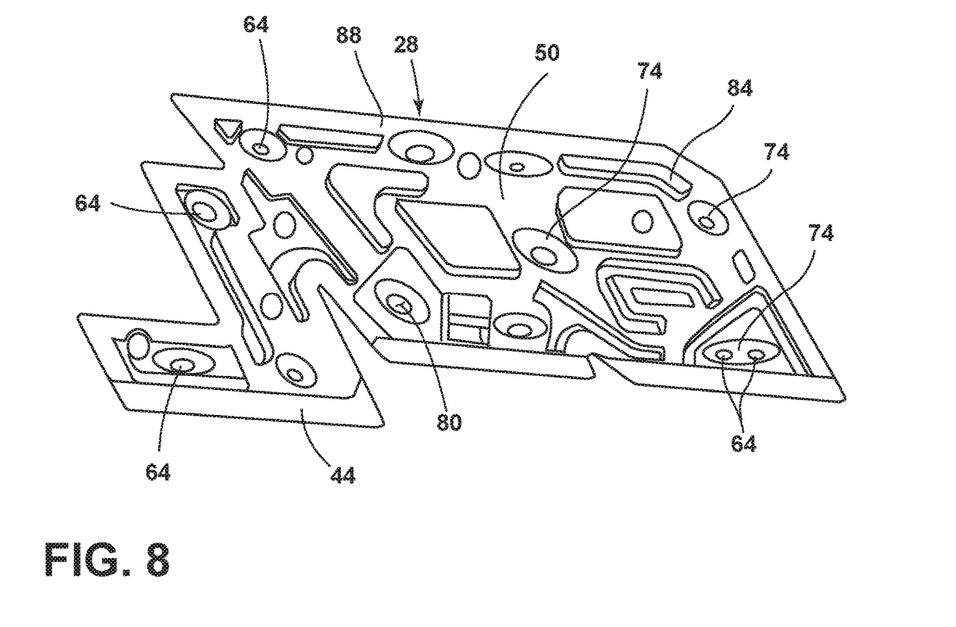
FIG. 8 is a rear perspective view of the badge defining a plurality of cavities, according to one embodiment.
Figure 9:
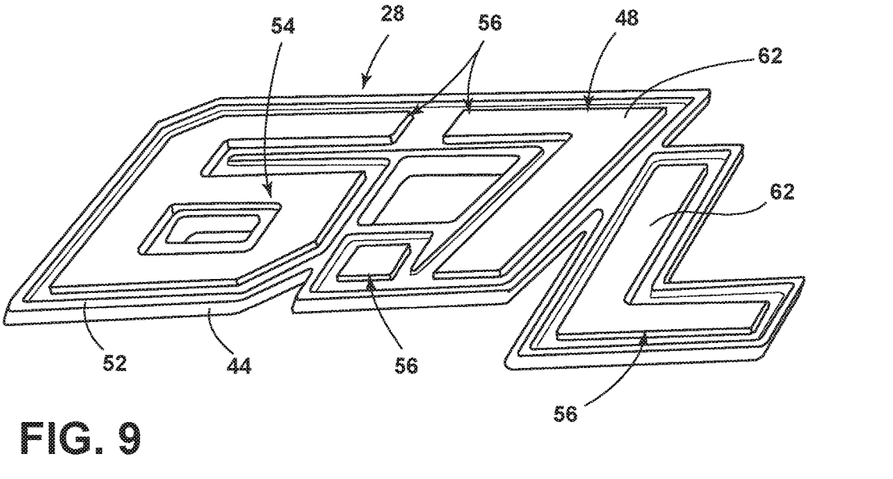
FIG. 9 is a front perspective view of the badge having indicia defined by an overmold material, according to the embodiment of FIG. 8.
Figure 10:
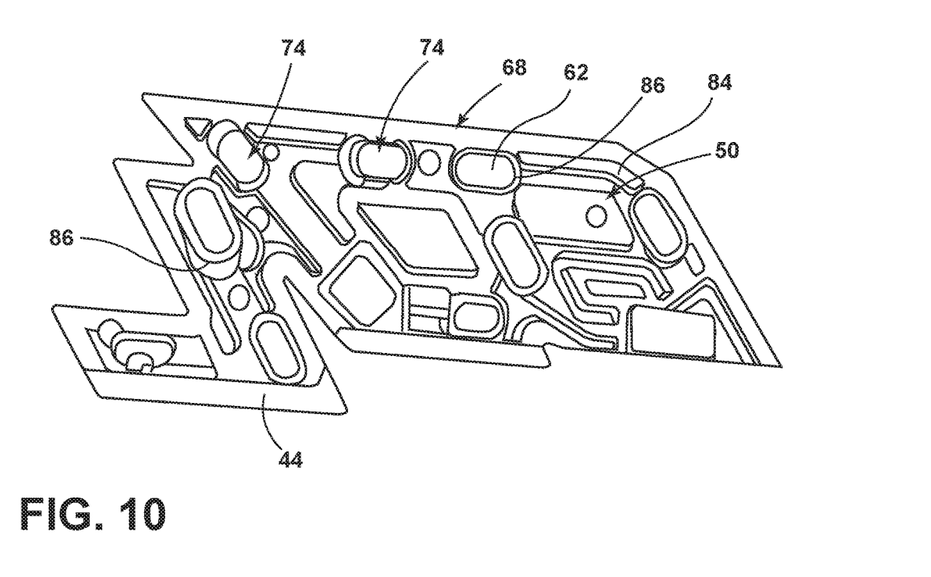
FIG. 10 is a rear perspective view of the badge having the overmold material disposed within the plurality of cavities, according to the embodiment of FIG. 8.

Referring to FIGS. 8-10, the indicia 56, rather than being surrounded by the overmold material 62, may be defined by the overmold material 62. Additionally, in some embodiments, the indicia 56 may be defined by the substrate 44 and the overmold material 62 simultaneously.

The one or more troughs 74, like the one or more apertures 64 that are surrounded by the one or more troughs 74 on a rear portion 50 of the substrate 44, may be of varied size and/or geometry. Once the overmold material 62 is disposed within the one or more troughs 74, the one or more troughs 74 may be partially and/or completely filled. As described above, the one or more troughs 74 may have a wider cross-sectional width $w_3$ than the aperture such that the overmold material 62 extends along the front portion 48 and the rear portion 50 of the substrate 44. In embodiments in which the one or more troughs 74 are completely filled, overmold flash 86 may be disposed on a top surface 88 of the one or more troughs 74. The flash 86 may further adhere the overmold material 62 to the substrate 44 in various embodiments.

One or more ribs 84 may be disposed on the rear portion 50 of the substrate 44. As illustrated, the ribs 84 are disposed between the one or more troughs 74 and extend between each trough and a proximately disposed trough. The ribs 84 may be defined by any part of the substrate 44 and disposed in areas prone to high stresses. The ribs 84 may be of any thickness. In embodiments in which the thickness of the ribs 84 causes sink on the front portion 48 of the substrate 44, the overmold material 62 may conceal the sink. It should be appreciated that the ribs 84 may be discrete structures or connected in a branched structure and spaced apart without departing from the scope of the present disclosure.

A variety of advantages may be derived from the use of the present disclosure. For example, use of the badge provides a unique aesthetic appearance to the vehicle. Moreover, the badge may provide passive illumination to the vehicle. The badge may also employ a wide range of products therein that have low adhesive characteristics. The badge may be manufactured at low costs when compared to standard vehicle badge assemblies.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited, to physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A badge, comprising:
   a substrate coupled to a bezel;
   one or more apertures defined by the substrate and extending from a front portion to a rear portion of the substrate;
   one or more troughs defined by the substrate and disposed on a rear portion of the substrate; and
   an overmold material disposed on the front portion of the substrate, through the one or more apertures, and within the one or more troughs.

2. The badge of claim 1, wherein the front portion of the substrate includes a central portion and a rim portion and the one or more apertures are defined within the central portion.

3. The badge of claim 2, wherein a textured surface is formed on portions of the substrate that contact with the overmold material.

4. The badge of claim 2, wherein the substrate defines one or more indicia, the indicia extending forwardly of the central portion.

5. The badge of claim 2, further comprising:
   a luminescent structure disposed on the front portion, wherein the luminescent structure comprises at least one luminescent material configured to convert an excitation light received from at least a portion of a light source into a visible light.

6. The badge of claim 1, wherein the overmold material contains an elastomeric material.

7. The badge of claim 1, wherein the one or more apertures includes a first aperture having a first width and a second aperture having a second width, the second width larger than the first width.

8. An emblem, comprising:
   a substrate;
   a first aperture defined by the substrate having a first width;
   a trough defined by the substrate and disposed on a rear portion of the substrate, the trough having a second width that is wider than the first width; and
   an overmold material disposed on a front portion of the substrate, through the first aperture, and within the trough.

9. The emblem of claim 8, further comprising:
   a second aperture of defined by the substrate, wherein the first aperture has a first width and the second aperture has a second width that is larger than the first width.

10. The emblem of claim 9, wherein the first aperture is disposed proximately to a rim portion of the substrate and the second aperture is disposed on a background portion of the substrate.

11. The emblem of claim 8, further comprising:
    indicia extending forwardly from the front portion of the substrate, wherein the overmold material is disposed around the indicia on the front portion of the substrate.

12. The emblem of claim 8, further comprising:
    a luminescent structure disposed on the front portion, wherein the luminescent structure comprises at least one luminescent material configured to convert an excitation light received from at least a portion of a light source into a visible light.

13. The emblem of claim 11, wherein the substrate defines a rim portion and the overmold material is disposed between the rim portion and the indicia, wherein the rim portion extends forwardly of the overmold material.

14. A badge, comprising:
    a substrate having a front portion and a rear portion;
    indicia disposed on the front portion;
    an aperture defined by the substrate; and
    an overmold material disposed on the front portion, through the aperture, and along the rear portion.

15. The badge of claim 14, wherein the overmold material is disposed around the indicia on the front portion.

16. The badge of claim 14, further comprising:
    a decorative layer disposed on the indicia.

17. The badge of claim 16, wherein the decorative layer is disposed between a vertical portion of the indicia and the overmold material.

18. The badge of claim 14, further comprising:
    a luminescent structure disposed on the indicia and configured to luminesce in response to receiving excitation light.

19. The badge of claim 18, wherein the luminescent structure includes a long-persistence luminescent material therein.

20. The badge of claim 18, wherein the luminescent structure comprises at least one luminescent material configured to convert an excitation light received from at least a portion of a light source into a visible light.

* * * * *